F. R. Dufour,
Hay Elevator.
No. 97,282. Patented Nov. 30, 1869.
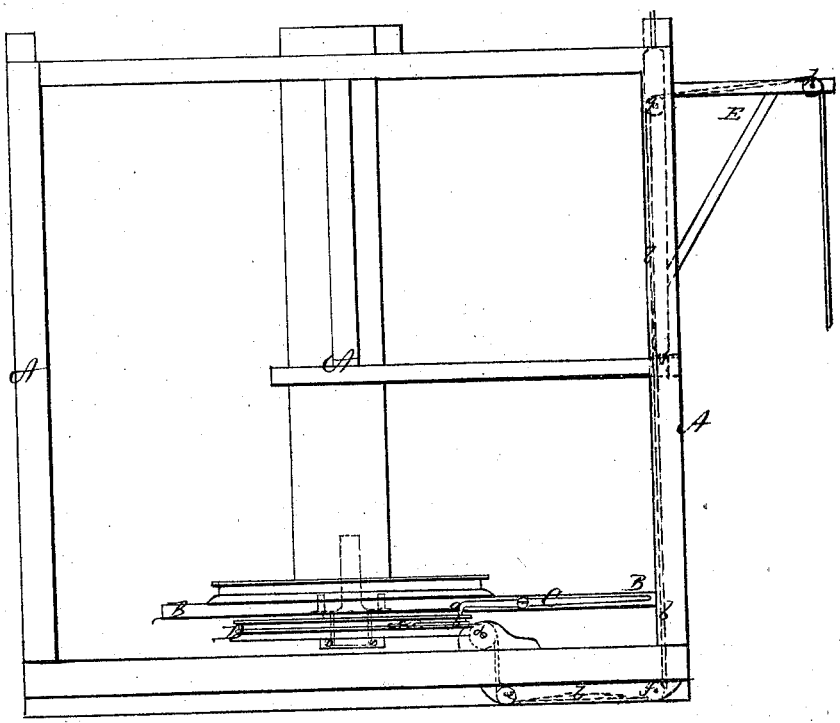
Witnesses
John A. Ellis
H. N. Miller
Inventor
F. R. Dufour,
Per
J. H. Alexander
Atty.

United States Patent Office.

F. R. DUFOUR, OF VEVAY, INDIANA.

Letters Patent No. 97,282, dated November 30, 1869.

IMPROVEMENT IN HAY-ELEVATORS.

The Schedule referred to in these Letters Patent and making part of the same.

To all whom it may concern:

Be it known that I, F. R. DUFOUR, of Vevay, in the county of Switzerland, and State of Indiana, have invented certain new and useful Improvements in Hay-Elevators; and I do hereby declare that the following is a full, clear, and exact description thereof, reference being had to the accompanying drawings, and to the letters of reference marked thereon, which form a part of this specification.

The nature of my invention consists in the construction and general arrangement of a "hay-elevator," as will be hereinafter fully set forth.

In order to enable others skilled in the art to which my invention appertains, to make and use the same, I will now proceed to describe its construction and operation, referring to the annexed drawings, which represent the frame-work of a barn with the elevator attached.

A represents the frame-work of a barn.

In the centre of the ground floor of the barn A the horse-power is placed.

B is the sweep, to which the horse is hitched.

To the side of the sweep B is pivoted a lever, C, the inner end of which is bent downward, forming a hook, $a$, that is just above and within the outer circumference of the reel D. This reel is provided, on its upper side, near its circumference, with a series of holes, for the hook $a$ to catch into.

When the horse is in motion, it is only necessary to raise the outer end of the lever C, and the hook $a$ will catch in one of said holes and turn the reel D. Then, to throw off the power, lower the outer end of the lever.

The hoisting-rope $b$, which is attached to the reel D, by means of a hook, $c$, passes around pulleys $d$, $e$, and $f$, in the floor of the barn, and up to a pulley, $g$, in the upper inner end of an upright pivoted crank, E, in the hay-mow, thence over a pulley, $h$, in the outer end of said crank, down to the ground outside of the barn.

When the hay is hoisted high enough, the crank E is swung around, so as to bring the hay within the mow, when the horse-power is thrown off, as above described, the hay unloaded from the fork, the crank swung outward again, and the fork lowered to the ground.

Having thus fully described my invention,

What I claim as new, and desire to secure by Letters Patents, is—

The arrangement, in combination with the horse-power B C D, of the hoisting-rope $b$, hook $c$, pulleys $d\ e\ f$, and crank E, having pulleys $g$ and $h$, substantially as shown and described.

In testimony that I claim the foregoing as my own, I affix my signature, in presence of two witnesses.

F. R. DUFOUR.

Witnesses:
    THOS. H. DOWNEY,
    B. F. SCHENCK.